Oct. 14, 1969
B. J. SEGER
3,471,959
MODULAR SIGN COMBINATION
Filed Sept. 6, 1967
2 Sheets-Sheet 1
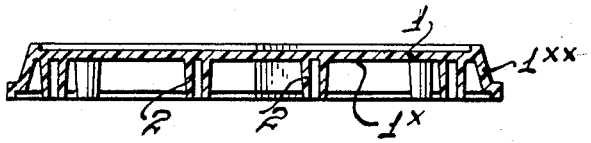
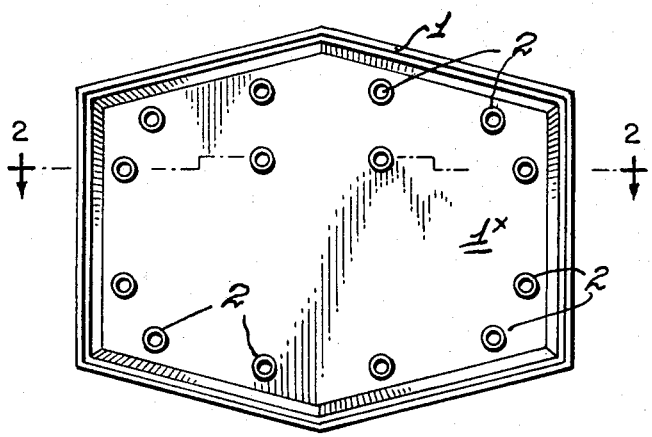
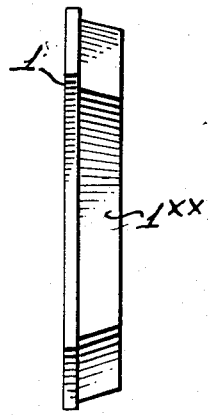
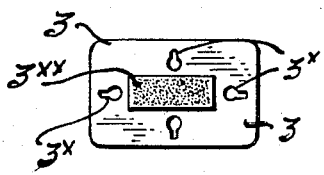
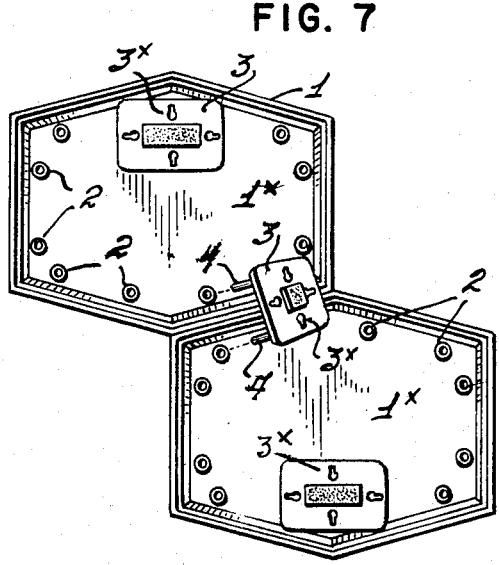
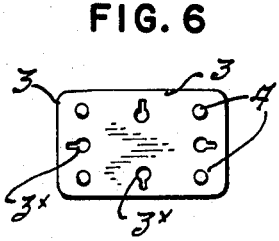
INVENTOR
Ben J. Seger
BY
ATTORNEY Oct. 14, 1969  B. J. SEGER  3,471,959
MODULAR SIGN COMBINATION Filed Sept. 6, 1967  2 Sheets-Sheet 2

INVENTOR
Ben J. Seger
BY H. Lee Helms
ATTORNEY

United States Patent Office 3,471,959
Patented Oct. 14, 1969

3,471,959
MODULAR SIGN COMBINATION
Ben J. Seger, 5 Mead Lane, Roslyn, N.Y. 11576
Filed Sept. 6, 1967, Ser. No. 665,899
Int. Cl. G09f 1/12, 7/00
U.S. Cl. 40—152                                           3 Claims

ABSTRACT OF THE DISCLOSURE

The invention consists of a modular display comprising a plurality of hexagonal plaques, each having a front face and a rear face, each plaque having at its rear face a plurality of connecting members, adapted to connect other like plaques, said connecting members being positioned along the angularly extending marginal areas of the plaque, in combination with means for engaging and connecting said plaque to selected marginal areas of a plurality of the plaques, and comprising a plate having projected from one place thereof opposed sets of connecting members adapted to engage and hold selected connecting members of a plurality of said hexagonal plaques in angular, ring and straight line formations.

---

The invention will be described with reference to the accompanying drawings, in which:

FIGURE 1 is a plan view of one of the plaques showing its rear face.

FIGURE 2 is a longitudinal section, taken on the line 2—2, FIG. 1.

FIGURE 3 is an end elevation of the plaque.

FIGURE 4 is a front face plan view of the connectig plate for a plurality of the plaques.

FIGURE 5 is a side elevation of the connecting plate.

FIGURE 6 is a plan view showing the rear face of the connecting plate.

FIGURE 7 is a plan view showing two of the plaques in angular relationship, their rear faces being shown along with three of the connecting plates, an intermediate one of the plates being tilted to expose two of its posts ready to enter connecting socket members carried by the two plaques.

Figure 8:
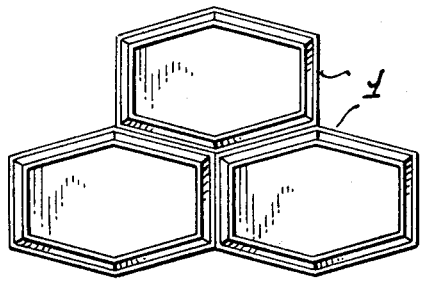
FIGURE 8 is a top face view of three of the plaques in connected group position.

In FIGS. 8 to 11, inclusive, the front face of each plaque is shown.

Referring to FIGURES 1, 2 and 3 of the drawings, it will be seen that the plaque consists of a member preferably molded from plastic and having a wall at 1 with a front face, and a rear face indicated at $1^x$. From wall 1 are projected at its rear face, a plurality of hollow posts 2 which extend along the margins of the plaque and which are in equally positioned sets of two posts each. The plaque is hexagonal and the sets of hollowed posts are aligned accordingly. Reference to FIGURE 3 will show that the margins of each plaque are strengthened by flanges at $1^{xx}$ which follow the hexagonal formation of the plaque.

A purpose of the plaque formation, together with the holding means for a plurality thereof, is to enable unusual arrangements of a plurality of the plaques, on the front faces of which may appear signs, decorative features, etc., and in practice the size of the plaques has been and may be substantial. By the unusual and various grouping of the plaques, they are of special utility in decoration and advertising promotion.

Referring to FIGURES 4, 5 and 6, it will be seen that the plaques are adapted to be connected by connecting members 3, carrying two opposed sets of posts 4 adapted to be frictionally received within the hollow or apertured posts 2 of the plaques. Of course the connecting plate 3 may have hollow or recessed posts, and the plaques may have posts of usual type to frictionally enter the recesses. Also, the connecting members in their groups on the plaques and in their groups on the connecting plate, are not necessarily in post form.

The connecting plates preferably have a plurality of apertures as indicated at $3^x$, by which the topmost plaque of a connected group may be hung on any suitable support, and the connecting plates preferable carry a wall contacting cushion $3^{xx}$.

Figure 9:
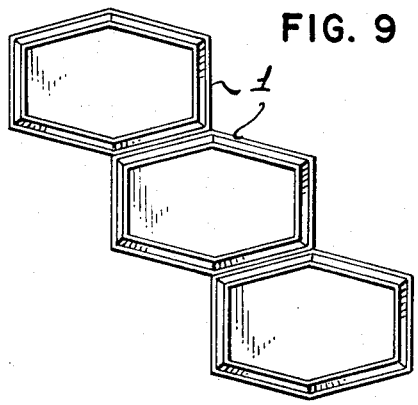
FIGURE 9 is a view showing the front faces of three plaques held in straight line angular position.
Figure 10:
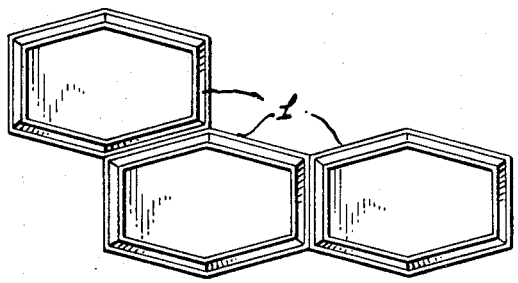
FIGURE 10 is a view showing three of the plaques, two of the latter being in horizontal straight line position and one plaque being shown above an offset to the left of one plaque.
Figure 11:
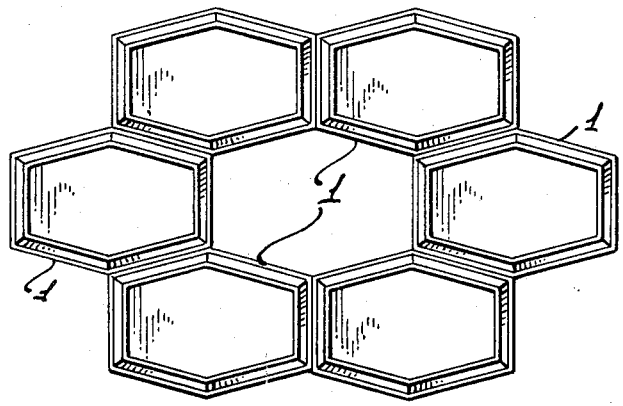
FIGURE 11 is a view showing six of the plaques held in ring formation.

Reference to FIGURES 8 and 11, inclusive, show various groupings of the plaques, as held together by the connecting plates and showing four of many different groupings that can be made. Thus FIGURE 11 shows six of the plaques grouped in ring formation, and FIGURE 9 shows three of the plaques grouped in angular position. By adding two additional plaques to FIGURE 9, the group will be in V-formation. FIGURES 8 and 10 show additional groupings of the plaques.

It will be understood that various modifications may be made in the form and arrangement of the elements comprising the embodiment illustrated in the drawings without departing from the spirit of the invention.

Having described my invention, what I claim and desire to secure by Letters Patent, is as follows:

1. A modular display comprising a plurality of plaques having angularly related margins, each plaque having a front face and a rear face, and having at its rear face a plurality of connecting members adapted to connect the plaque to other like plaques, said connecting members extending along the angular marginal areas of the plaque, in combination with means for connecting said plaque to selected others of like plaques, and comprising a plate having projected, from one face thereof, opposed sets of connecting members adapted to engage and hold selected connecting members on a plurality of said angular-marginal plaques in selected different relative positions thereof and adapted to hold together a plurality of said angular-marginal plaques in angular, ring, and straight line formation.

2. In a modular display, constructed in accordance with claim 1, a plaque having a front face and a rear face and having hexagonal margins, said plaque having at its rear face along said hexagonal margins, a plurality of sets of equally spaced connecting members, in combination with a connecting plate having opposed sets of connecting elements adapted to engage sets of connecting elements of two plaques and further adapted to hold said plaques together in either straight line or in angular relationship.

3. In a modular display constructed in accordance with claims 1 and 2, a plaque having a front face and a rear face and having a hexagonal margin, a plurality of sets of posts carried by the plaque on its rear face and extended along said hexagonal margin, in combination with the connecting plate, a plurality of sets of post carried by adapted for frictional engagement with the posts on the plate, the plate being adapted to hold selected plaques in selected different relative positions.

(References on following page)

References Cited

UNITED STATES PATENTS

| | | | |
|---|---|---|---|
| 841,998 | 1/1907 | Mulford | 52—584 |
| 905,189 | 12/1908 | Hyke | 52—582 |
| 3,070,914 | 1/1963 | Henderson | 40—156 |
| 3,296,764 | 1/1967 | Tremblay | 52—584 |
| 3,339,302 | 9/1967 | Mallory | 40—152 |

EUGENE R. CAPOZIO, Primary Examiner

WENCESLAO J. CONTRERAS, Assistant Examiner

U.C. Cl. X.R.

40—125